Sept. 23, 1952 — L. FRANK — 2,611,289
NUT-HOLDING MAGAZINE WRENCH
Filed Oct. 25, 1946
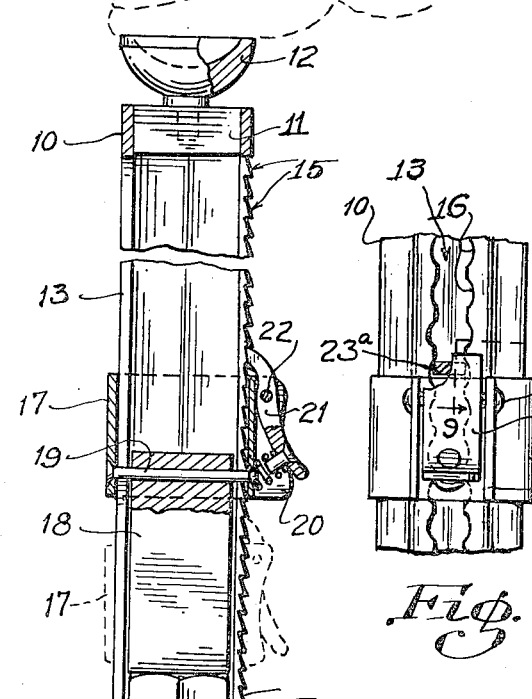
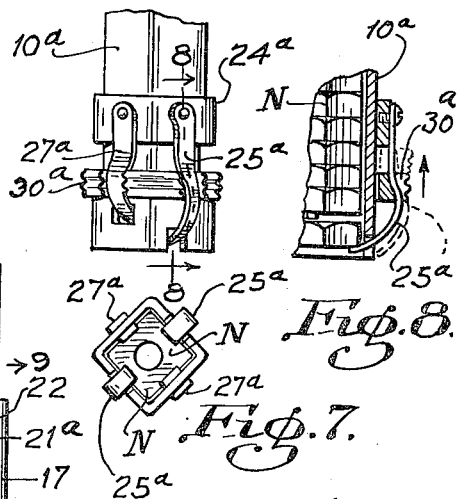
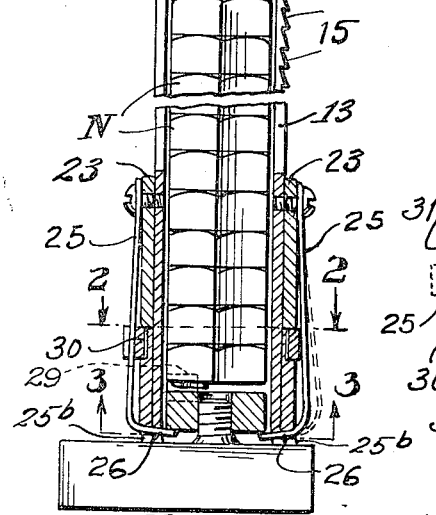
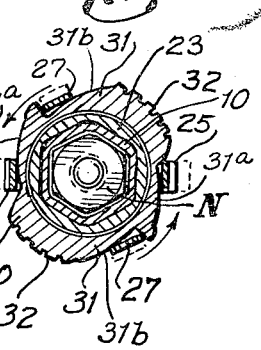
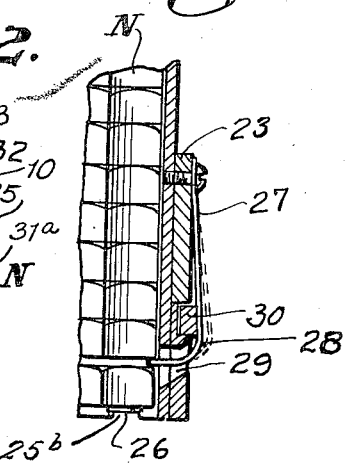
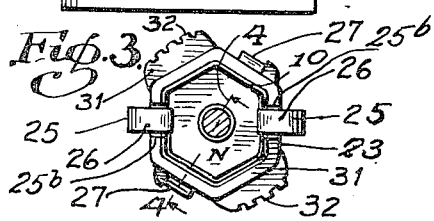
INVENTOR.
LOUIS FRANK
BY Martin P. Smith
ATTORNEY.

Patented Sept. 23, 1952

2,611,289

UNITED STATES PATENT OFFICE 2,611,289

NUT-HOLDING MAGAZINE WRENCH

Louis Frank, Fellows, Calif.

Application October 25, 1946, Serial No. 705,705

4 Claims. (Cl. 81—125)

My invention relates to a nut ejecting magazine and driver, and has for its principal object to provide a simple, practical and highly effective tool, particularly adapted for the convenient and rapid manipulation and driving or setting of small nuts such as are used in chronometers, radio sets and other comparatively small instruments, wherein the setting of many small nuts is necessary.

Further objects of my invention are, to provide a nut magazine and driver comprising a tubular magazine having a finger rest on top, means at its lower end for holding the nuts while they are being set or driven and for permitting their discharge from the magazine and further, to provide simple and efficient means for feeding the nuts downwardly in the magazine.

With the foregoing and other objects in view, my invention consists in certain novel features of construction and arrangement of parts which will be hereinafter more fully described as claimed and illustrated in the accompanying drawings, in which:

Fig. 1 is a vertical section taken lengthwise through the center of my improved nut magazine and driver.

Fig. 2 is a horizontal section taken on the line 2—2 of Fig. 1.

Fig. 3 is a horizontal section taken on the line 3—3 of Fig. 1.

Fig. 4 is a detail vertical section taken on the line 4—4 of Fig. 3.

Fig. 5 is a fragmentary elevational view showing a modified form of the means for feeding the nuts downwardly in the magazine.

Fig. 6 is a fragmentary elevational view of the means for holding the lowermost nut in the magazine while said nut is being set or driven.

Fig. 7 is an inverted plan view of the modified structure seen in Fig. 6.

Fig. 8 is a vertical section taken on the line 8—8 of Fig. 6.

Fig. 9 is a detail vertical section taken on the line 9—9 of Fig. 5.

Referring by numerals in the accompanying drawing and particularly Figs. 1 to 4 inclusive, which illustrate a preferred embodiment of my invention, 10 designates a tube which may be hexagonal in cross section as shown in said figures or square, as shown in Figs. 6, 7 and 8, and seated in the upper end of said tube is a block 11 on which is mounted for rotation, a shallow cup 12 adapted to serve as a rest for the index finger.

This tube which forms a magazine for nuts N, is provided at diametrically opposite points with longitudinally disposed slots 13, the lower ends of which terminate a short distance above the lower end of said tube.

Arranged to slide freely on tube 10 is a collar 17, which carries a plunger block 18, same being suspended from a pin 19 passing through the walls of collar 17, through slots 13 and the upper end of said plunger block.

Formed on the outer face of tube 10 adjacent one of the slots 13 are ratchet teeth 15 and adapted to engage therewith, is the upper end of a spring-pressed pawl 21, pivoted on a pin 22 that is seated in ears 20 projecting outward from collar 17.

Thus, collar 17 and block 18 are held against upward movement until the point of pawl 21 is released from the teeth 15. A modified form of this ratchet and pawl structure is shown in Figs. 5 and 9 wherein the edges of one of the slots 13 are provided with notches 16 and adapted to engage therein is the point 23a, of pawl 21a. See Fig. 9. Thus the pressure of the spring against pawl 21 and the consequent engagement of the point of pawl between the ratchet teeth 15, holds the collar 17 and block in differently adjusted positions.

Suitably mounted on the lower end of tube 10 is a sleeve 23, and mounted for rotation on the lower portion thereof is a ring 30 having two oppositely disposed high portions 31, the outer faces of which are corrugated as designated by 32.

Between these high portions 31, the outer face of ring 30 is formed with two pairs of eccentric faces 31a and 31b and bearing on one pair of said faces 31a are flat springs 25, and a second pair of slightly shorter flat springs 27 bear on the other pair 31b of eccentric faces.

The upper ends of all the springs are suitably secured to the upper portion of sleeve 23 and the lower ends 26 of springs 25 extend inwardly through shallow notches 25b formed in the lower edges of tube 10 and sleeve 23 and terminate a short distance inwardly from the inner face of said tube (see Figs. 1 and 3).

The lower ends 28 of springs 27 are bent inward and extend through apertures such as 29 formed in sleeve 23 and wall of tube 10, short distances above the inwardly bent ends 26 of springs 25. Thus under normal conditions, ends 26 of springs 25 serve as detents for supporting the lowermost nut in magazine 10 and ends 28 of springs 27 are disposed between the top of the lowermost nut and below the nut immediately above said lowermost nut (see Figs. 1 and 4).

To load the magazine, pawl 21 is released from rack teeth 16, thus enabling collar 17 when raised to draw block 18 to the top of the magazine. Ring 30 is now rotated so as to cause eccentric faces 31a and 31b to move springs 25 and 27 outward so as to withdraw the bent lower ends thereof from the chamber through the magazine.

Nuts N are now fed into the magazine until same is full and ring 30 is now reversely rotated to permit springs 25 and 27 to return to their normal positions with the ends 26 of springs 25 positioned beneath the lowermost nut and the ends 28 of springs 27 positioned between the two lowermost nuts.

The magazine is now held between the thumb and second finger with index finger resting on cup 12 and after the lowermost nut is applied to the bolt or threaded stud, the magazine is rapidly rotated to drive the nut to the desired tight position.

Due to depth of notches 25b, the ends 26 of springs 25 are positioned slightly above the ends of tube 10 and sleeve 23 and thus, as the underface of the driven nut moves past the notches 25b, the ends 26 of springs 25 will be engaged and moved outward so as to automatically disengage the tool from said driven nut.

The operator now disengages pawl 21 from the ratchet and moves collar 17 and block 18 downward, by pressure of the thumb or second finger, so as to force the nut held by the ends 28 of springs 27, downward onto the ends 26 of springs 25, in position to be driven on the subsequent operation.

The ratchet and pawl holds the column of nuts against upward movement while the lowermost nut is being driven.

In Figs. 6 to 9 inclusive, I have shown a modified construction wherein a ring 30a is mounted to slide a short distance vertically on tube 10a beneath springs 25a and 27a so that when said ring is moved upward, it will flex the lower portions of said springs outwardly away from the nuts within the magazine.

In these figures I have shown a magazine square in cross section so as to accommodate square nuts and this modification includes a collar 24a, which functions the same as sleeve 23 and secured to said collar are the upper ends of springs 25a, similar to springs 25, and 27a similar to springs 27.

To compensate for nuts of different thickness, it is only necessary to change the springs 27 and 27a, using longer springs for thin nuts and shorter springs for thick nuts.

My improved tool may be made wholly from light weight metal or from plastics and metal and is highly effective and time saving whenever the setting of large numbers of small nuts is required, for instance, in clocks, watches, typewriters, adding machines, cash registers, cameras, gauges, radio sets, small electrical apparatus and instruments used for the control and navigation of ships, aircraft and the like.

Obviously minor changes in the size, form and construction of the various parts of my improved nut ejecting machine and driver may be made and substituted for those herein shown and described without departing from the spirit of the invention, the scope of which is set forth in the appended claims.

I claim as my invention:

1. In a nut ejecting magazine and driver, a tubular magazine, sliding means in said magazine, manually operable means arranged for sliding movement on said magazine and connected to the means within the magazine for forcing nuts downwardly therethrough, two pairs of diametrically arranged springs mounted on the lower portion of said magazine, each pair of springs being of different lengths, the lower ends of which springs extend inwardly so as to occupy positions above and below the lowermost nut in said magazine, and means mounted for rotation on the lower portion of said magazine between said springs and the magazine for simultaneously moving the lower ends of said springs outwardly.

2. A nut ejecting magazine and driver as set forth in claim 1 and said rotating spring-actuating means being provided with eccentric faces on which said springs bear.

3. In a nut ejecting magazine and driver, a tubular member polygonal in cross section so as to receive nuts in superimposed relation, a manually operable plunger arranged for sliding movement in said tube for moving nuts downwardly therethrough, pairs of springs mounted on the lower portion of said member, the lower end portions of the members of one pair of springs extending inwardly so as to occupy positions beneath the lowermost nut in the tubular member, the lower end portions of the members of the other pair of springs extending inwardly so as to occupy positions between the two lowermost nuts, and an eccentric edged ring mounted for rotation on the tubular member beneath said springs for flexing their lower ends outwardly.

4. A nut ejecting magazine and driver as set forth in claim 3, with the members of each pair of springs being disposed diametrically opposite to each other and the two pairs of springs being spaced apart circumferentially on said tubular member.

LOUIS FRANK.

REFERENCES CITED

The following references are of record in the file of this patent:

UNITED STATES PATENTS

| Number | Name | Date |
| --- | --- | --- |
| 1,052,077 | McMillan | Feb. 4, 1913 |
| 1,101,658 | Ragsdale | June 30, 1914 |
| 2,247,500 | Hutchison | July 1, 1941 |
| 2,256,012 | Blair | Sept. 16, 1941 |

FOREIGN PATENTS

| Number | Country | Date |
| --- | --- | --- |
| 217,581 | Great Britain | Mar. 5, 1925 |